(12) United States Patent
Bouvet et al.

(10) Patent No.: US 8,665,927 B2
(45) Date of Patent: Mar. 4, 2014

(54) ACQUISITION METHOD WITH IMPROVED MULTI-FREQUENCY CORRELATION

(75) Inventors: Denis Bouvet, Paris (FR); Ghislain Luneau, Paris (FR)

(73) Assignee: SAGEM Defense Securite, Paris (FR)

( * ) Notice: Subject to any disclaimer, the term of this patent is extended or adjusted under 35 U.S.C. 154(b) by 189 days.

(21) Appl. No.: 13/370,211

(22) Filed: Feb. 9, 2012

(65) Prior Publication Data
US 2012/0207144 A1 Aug. 16, 2012

(30) Foreign Application Priority Data

Feb. 11, 2011 (FR) ...................................... 11 00424

(51) Int. Cl.
*H04B 1/00* (2006.01)
(52) U.S. Cl.
USPC ........... 375/150; 375/136; 375/137; 375/146; 375/147; 375/260; 375/262; 375/265; 375/267; 375/340; 375/342; 375/343; 375/346; 375/347
(58) Field of Classification Search
USPC ......... 375/130, 136, 137, 146, 147, 150, 260, 375/262, 265, 267, 342, 346, 347, 350; 342/357.63, 357.64, 357.65, 357.68, 342/357.69, 357.74
See application file for complete search history.

(56) References Cited

U.S. PATENT DOCUMENTS

| 6,735,243 | B1 | 5/2004 | Akopian |
| 6,810,072 | B1* | 10/2004 | Akopian ....................... 375/143 |
| 8,005,172 | B2* | 8/2011 | Jang ............................... 375/343 |
| 8,193,980 | B2* | 6/2012 | Nayyar .................... 342/357.48 |
| 8,428,107 | B1* | 4/2013 | Best et al. ..................... 375/147 |
| 2010/0040115 | A1 | 2/2010 | Cho et al. |

OTHER PUBLICATIONS

David Akopian, A Fast Satellite Acquisition Method, ION GPS 2001, Sep. 11, 2001, pp. 2871-2881, Salt Lake City, UT, USA.

* cited by examiner

*Primary Examiner* — Dhaval Patel
(74) *Attorney, Agent, or Firm* — Blakely Sokoloff Taylor & Zafman (57) ABSTRACT

The invention relates to a method for acquisition of a signal (2) emitted by a satellite, by a receiver in a satellite Positioning System using a multi-code correlation and a multi-frequency correlation, also comprising the step in which if the error induced at the output from a first frequency-augmented correlator (14) at each instant in an integration period is greater than the code space between code correlators (12), the summated results of the first frequency-augmented correlator (14) are transferred to the summated results of a second frequency-augmented correlator (14), the second frequency-augmented correlator (14) using the same frequency-shift as the first frequency-augmented correlator (14) and being associated with a second code correlator (12) that is shifted by the code space from the first code correlator (12) with which said first frequency-augmented correlator (14) is associated.

10 Claims, 2 Drawing Sheets

ACQUISITION METHOD WITH IMPROVED MULTI-FREQUENCY CORRELATION

BACKGROUND OF THE INVENTION

The domain of the invention is Global Navigation Satellite Systems (GNSS), such as Global Positioning System (GPS), Galileo or GLONASS. The invention relates to the acquisition of signals output from satellites in such a positioning system by a receiver with at least one channel comprising several code correlators.

The invention is applicable to wide band spread spectrum signals, for example of the Code Division Multiple Access (CDMA) type known to those skilled in the art, typically but not limitatively for GPS/GNSS signals, either with Binary Phase Shift Keying (BPSK) modulation referring to binary modulation by phase shift or Binary Offset Carrier (BOC) and derivatives of these.

The acquisition of signals in a GPS, Galileo or GLONASS type GNSS system consists of aligning the signal output from a satellite with a replica signal generated locally by the receiver. To succeed this alignment, the receiver must:

Apply a compensation for the Doppler shift of the carrier for the satellite signal being searched for relative to the nominal frequency of said satellite signal carrier, this shift depending on the apparent speed of the satellite relative to the receiver and the difference between the theoretical reference frequency and the real frequency supplied by the local oscillator of the receiver; this shift can be estimated with more or less uncertainty depending on available information (satellite almanac, receiver speed, aging of the oscillator).

Shift the local code until it is aligned onto the code emitted by the satellite. This alignment is confirmed when the result of the correlation integrated over a more or less long period exceeds a detection threshold, the definition of the integration time and detection thresholds depending on the power of the received satellite signal and the presence and power of interference.

Therefore the search for satellite signals is made in the two dimensions "time-frequency". It is done by one or several correlators, each correlator testing a time-frequency assumption by correlating the received signal compensated for the Doppler shift with the locally generated replica signal.

Finally, the GNSS signal acquisition or re-acquisition times depend on:

The size of the satellite signal "time-frequency" search domain;
The number of correlators used for the search;
The time necessary to determine if the signal is present or absent for a "time-frequency" assumption.

Techniques have been developed to reduce signal acquisition times for a signal output by a satellite in a satellite positioning system.

The following description is illustrated with reference to FIG. 1 that is a principle diagram of a channel of a receiver in a satellite positioning system using multi-code correlation and multi-frequency correlation.

A GNSS receiver has several channels that it uses to simultaneously acquire and then track several satellites. A first way of reducing acquisition times is to increase the number of code correlators 12 per channel, by introducing a shift register 10 to generate several replica signals $S_1$, $S_c$, $S_N$, for example N replica signals, shifted by a code moments (conventionally α=½), which simultaneously tests one code assumption for each given frequency, namely N assumptions; this is referred to as multi-code correlation.

The number of correlators can also be extended by frequency processing of the results output from code correlators 12; this is referred to as post-detection multi-frequency correlation, since the frequency processing is done on the output from the multi-code correlation results, unlike architectures described for example in the article "A Fast Satellite Acquisition Method" by David Akopian presented in the ION GPS 2001, Sep. 11-14 2001, Salt Lake City.

It can be broken down as follows:
sampling of correlation results at period T/M
the use of frequency-augmented correlators 14 for the convolution of outputs from code correlators with carriers shifted relative to the central frequency by $\omega_m = m/(aT)$ where m∈[−M; +M]
summation of M samples to reconstitute complex outputs (I,Q) on the coherent integration period T.

For each code correlator 12, the result obtained is thus complex outputs (I,Q) of 2M+1 frequency-augmented correlators 14 shifted in steps of m/(aT) around a central frequency that is the nominal frequency of the carrier corrected by the Doppler shift.

With this post-detection multi-code and multi-frequency correlation mechanism, the search domain in time-frequency is scanned by simultaneously testing outputs from N×(2M+1) frequency-augmented correlators 14, which reduces satellite signal acquisition or re-acquisition times.

However, the use of a post-detection multi-frequency correlation has the disadvantage that the replica signal code generation speed is proportional by a factor f to the nominal carrier frequency compensated for the Doppler shift, but not to carriers shifted by $\omega_m$ relative to this reference.

For example, satellites in the GPS system emit on at least two carriers L1=1575.42 MHz and L2=1227.6 MHz. The phase of carrier L1 is modulated by a first spread code called C/A ("Coarse Acquisition") and the navigation message, and it is modulated in quadrature by a second encrypted spread code called P(Y) and the navigation message. The phase of carrier L2 is modulated by at least the spread code P(Y) and the navigation message. The throughput of the C/A code is $1.023 \times 10^6$ bits or moments per second, while the throughput of the P(Y) code is $10.23 \times 10^6$ bits or moments per second.

Therefore the scale factor f is typically 1/1540 for the C/A code on carrier L1, 1/154 for the P(Y) code on carrier L1 and 1/120 for the P(Y) code on carrier L2. The result is that the consequences of an unsuitable compensation for the Doppler shift will be greater for acquisition of the P(Y) code than for acquisition of the C/A code.

The generation speed of the replica signal $S_r$ is coherent with the nominal frequency of the carrier compensated for the Doppler shift. On the other hand, the generation speed of the replica signal $S_r$ is not coherent with the carriers shifted by $\omega_m$ relative to this central frequency.

This incoherence is not a problem provided that the integration of the increased correlator outputs is only for a short duration. On the other hand, in the presence of interference or jammers, the signal to noise density ratio $C/N_0$ drops and integration times $T_i$ have to be longer to determine if the signal is present or absent for a given code-frequency assumption and this incoherence becomes a problem.

Thus, considering acquisition of GPS P(Y) signals on carrier L1 for a frequency-shift of $\omega_m$ Hz, the error on the code generation speed is $\omega_m/154$ code moments per second. This error then generates a code slip with time, in other words a progressive shift of the code generated relative to the signal code. This is a mistake induced by the shift relative to the central frequency of the frequency-shifted carriers used in frequency-augmented correlators 14.

Considering a space between code correlators 12 equal to a half-code moment, if the integration time for a first frequency-augmented correlator 14 associated with a first code correlator 12 shifted by $\omega_m$, exceeds $T_i > 77/\omega_m$, the signal will be displaced to a second frequency-augmented correlator 14 using the same frequency-shift as the first frequency-augmented correlator 14 and being associated with a second code correlator 12 that is shifted by the code spacing of the first code correlator 12 with which said first frequency-augmented correlator 14 is associated.

If nothing is done to correct the effects of this error induced by the shift relative to the central frequency of the frequency-shifted carriers used in the frequency-augmented correlators 14, the N frequency-augmented correlators 14 for which the frequency-shift is such that $|\omega_m| > 77/T_i$ become unusable and the signal acquisition will take longer because of the smaller number of useful frequency-augmented correlators 14.

Figure 2:
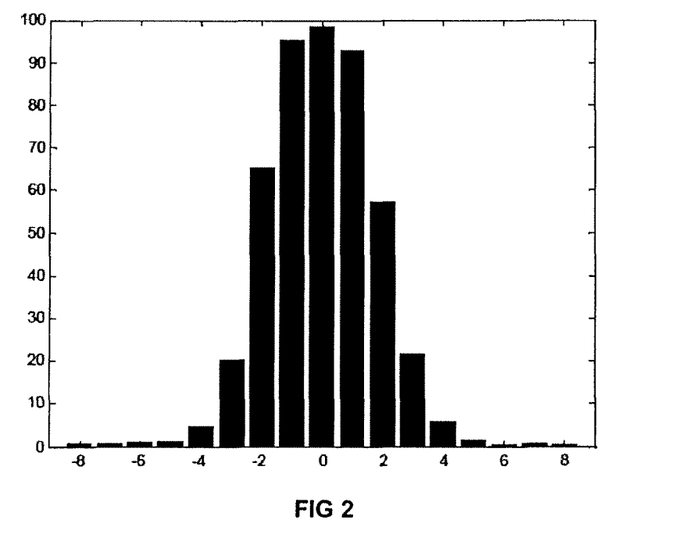
FIG. 2 is a graph showing the detection probabilities of a signal as a function of the frequency-shift index of carriers used in frequency-augmented correlators without applying the method according to the invention.

FIG. 2 shows an example of signal detection probabilities (in %) as a function of the index m of the frequency-shift between the central frequency with which the code generation speed is coherent and the real frequency of the searched signal. This figure shows the consequences of lack of compensation of the induced error for acquisition of P(Y) signals on L1 with a low signal-to-noise ratio. In this case, the necessary integration duration is of the order of several seconds, and the induced error for significant frequency-shifts exceeds the P(Y) code half moment and the integration results are invalid: almost no detection is possible for these frequency-augmented correlators 14.

Consequently, the satellite signal acquisition time may be significantly longer due to the small number of useful correlators.

SUMMARY OF THE INVENTION

The purpose of the invention is to reduce the satellite signal acquisition time, and to achieve this it proposes to correct the consequences of the error induced by the shift relative to the central frequency of the frequency-shifted carriers used in the frequency-augmented correlators 14.

To achieve this, according to a first aspect, the invention discloses a method for acquisition of a signal 2 emitted by a satellite, by a receiver in a satellite positioning system with several channels each comprising several code correlators 12 with which frequency-augmented correlators 14 are associated, the method comprising steps in which:
  code correlators 12 of a channel are used to create a multi-code correlation of the received signal with replica signals successively code-shifted relative to each other by a code space,
  frequency-augmented correlators 14 associated with a code correlator 12 are used to create a multi-frequency correlation of the result of the correlation of the code correlator 12 with carriers shifted in frequency relative to a central frequency coherent of the generation speed of the replica signal of the code correlator 12, an error being induced at the output from each frequency-augmented correlator 14 depending on the shift relative to the central frequency and the duration during which the results of the multi-frequency correlation are integrated,
the method including steps according to which:
  the successive results of each frequency-augmented correlator 14 are summated at several instants during an integration period $T_i$ of the results of the multi-frequency correlation,
  if the error induced at the output from a first frequency-augmented correlator 14 expressed as an integer number of code spaces between the code correlators 12 at each of these instants has increased relative to the induced error expressed as an integer number of code spaces between code correlators 12 at the output from the same frequency-augmented correlator 14 valid in the previous instant, then the summated results of the first frequency-augmented correlator 14 are transferred to the summated results of a second frequency-augmented correlator 14, the second frequency-augmented correlator 14 using the same frequency-shift as the first frequency-augmented correlator 14 and being associated with a second code correlator 12 that is shifted by the code space from the first code correlator 12 with which said first frequency-augmented correlator 14 is associated.

A few preferred but not limitative method aspects are as follows:
  the summated results of the frequency-augmented correlator 14 associated with the first code correlator 12 are transferred to the second frequency-augmented correlator 14 associated with the second code correlator 12, depending on the sign of the frequency-shift of the first frequency-augmented correlator 14 relative to the central frequency;
  the method is applied on a meta-channel composed of a plurality of channels in parallel using a multi-code correlation with code correlators 12 of said plurality of channels and a multi-frequency correlation with the frequency-augmented correlators 14 associated with said code correlators 12;
  the summation times of the successive results of each frequency-augmented correlator 14 are chosen at an inverse frequency of the sampling period T of the outputs from the frequency-augmented correlators 14;
  for each said instant, the method includes determination of the induced error, said determination and the transfer of summated results being used in parallel for frequency-augmented correlators 14 shifted by −m and m respectively relative to the central frequency;
  the frequency-shift of the carriers relative to the central frequency is $$\omega_m = \frac{m}{aT}$$

where m∈[−M; M], in which a and T are reals and M and m integers and in which:
  the results of the correlation by code correlators 12 are sampled at a period T/M,
  the output from a frequency-augmented correlator 14 corresponds to the sum of M samples of a convolution between the output from the code correlator 12 with which the frequency-augmented correlator 14 is associated and the frequency-shifted carrier relative to the central frequency;
  the induced error expressed as the moment of the spread code is determined at a time n×T according to:

$$\text{induced error } (nT) = \frac{nT|\omega_m|}{f}$$

where n is the integration increment such that n is a natural integer and f is a scale factor of the signal defined by $$f = \frac{\text{transmission throughput of the satellite signal spread code (moments/s)}}{\text{frequency of the satellite signal carrier wave (Hz)}}$$

the method comprises compensation for the Doppler shift used for the nominal frequency of the satellite signal carrier, said compensated nominal frequency corresponding to said central frequency;

for example, the satellite positioning system could be the GPS global positioning system, the carrier of said signal output from a satellite possibly being so-called carriers L1 or L2 with frequencies of 1575.42 MHz and 1227.6 MHz respectively, said signal being phase-modulated by a spread code that could be the C/A code or the P(Y) code.

According to a second aspect, the invention also relates to a receiver in a satellite positioning system with several channels each comprising several correlators 12, 14, said channels comprising at least a code replica generator 8, a shift register 10 and an acquisition module 3 to control compensation for the Doppler shift, said receiver also being configured to use the method according to the first aspect of the invention.

DETAILED DESCRIPTION

The following description applies to a method for acquisition of a signal emitted by a satellite; by a receiver in a satellite positioning system with several channels each comprising several code correlators 12 with which frequency-augmented correlators 14 are associated, conforming with a first aspect of the invention. A receiver according to a second aspect of the invention will also be described. As a non-limitative example, the acquisition method and the receiver will be described with reference to the GPS system.

The acquisition method uses a multi-code correlation using the code correlators 12 of a channel. This multi-code correlation uses replica signals $S_1$, $S_c$, $S_N$ successively code shifted from each other by a code space $\alpha$.

a multi-frequency correlation using frequency-augmented correlators 14 associated with a code correlator 12. This multi-frequency correlation uses carriers which are shifted in frequency relative to a central frequency coherent with the generation speed of the replica signal $S_r$ of the code correlator.

Figure 1:
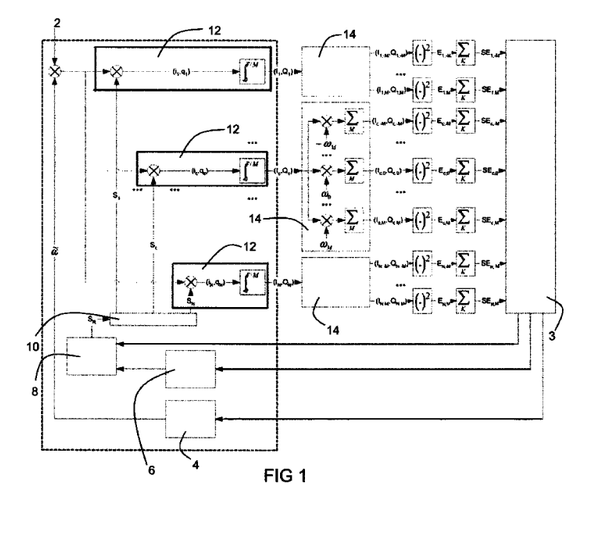
FIG. 1 is a principle diagram of a channel of a receiver in a satellite positioning system using a multi-code correlation and a multi-frequency correlation.

With reference to FIG. 1, a received signal 2 is a signal emitted by a satellite in a satellite positioning system. The Doppler shift of this received signal 2 is compensated by a carrier at a compensation frequency $\omega$, said carrier being output from a carrier controlled oscillator 4 controlled by an acquisition module 3. This acquisition module 3 also controls the code controlled oscillator 6 to control the code generation speed of the replica signal by a replica signal generator 8. The replica signal generator 8 generates a replica signal $S_r$ as a function of the information in the selected code provided by the acquisition module 3 and as a function of the control of the generation speed of said code.

The replica signal $S_R$ is then shifted by a code space $\alpha$ by a shift register 10 and the replica signals thus shifted $S_1$, $S_c$, $S_N$ are transmitted to the code correlators 12 that implement the multi-code correlation.

The outputs (I,Q) from the code correlators 12 are then transmitted to frequency-augmented correlators 14 that implement multi-frequency correlation. The quadratic sums of the components of the outputs from the frequency-augmented correlators 14 can then be calculated. The results of these operations are summated over an integration time $T_i = KT$, where K is the number of iterations and T is the sampling period of the outputs from the frequency-augmented correlators 14.

When one of these summated results exceeds a detection threshold, this means that a signal has been detected and therefore the time-frequency assumption corresponding to the code and frequency-shift used to obtain this summated result is valid. The code shift and the frequency-shift thus determined will be used to initialise tracking of the detected signal.

In order to scan the uncertainty frequency domain $\Delta w$ of the Doppler shift compensation, it is preferable to divide this domain $\Delta w$ into $2M+1$ frequency assumptions to determine the shift to be applied to the carriers. Thus, the frequency-shift of the carriers relative to the central frequency may be chosen as being:

$$\omega_m = \frac{m}{aT}$$

where $m \in [-M; M]$, where a and T are reals and M and m are integers.

Furthermore, in order to implement this multi-frequency correlation, the results of the correlation by the code correlators 12 are sampled at a period $T/M$, and the output from a frequency-augmented correlator 14 corresponds to the sum of M samples of a convolution between the output from the code correlator 12 with which the frequency-augmented correlator 14 is associated and the carrier shifted in frequency relative to the central frequency.

This is simply one non-limitative example, other shifts could be chosen.

The shift of carriers relative to the central frequency induces an error due to incoherence of the frequency of these carriers relative to the generation speed of the replica signal used in the code correlator 12, said replica signal being coherent with the central frequency. This central frequency corresponds to the nominal frequency of the carrier of the satellite signal 2 to which a Doppler shift compensation is applied.

This error induced at the output from each frequency-augmented correlator 14 depends on the shift relative to the central frequency and the duration during which the results of the multi-frequency correlation are integrated.

The results of each frequency-augmented correlator are summated at several instants during an integration period of the multi-frequency correlation results. These instants are preferably at a uniform spacing equal to a sampling period T of the outputs from the frequency-augmented correlators 14.

Considering the example of a first frequency-augmented correlator 14 that will be denoted $CAF_{c,m}$, associated with the $c^{th}$ code correlator for which m is its carrier frequency-shift index; the induced error is determined at each instant in an integration period $T_i$ of the correlation results of this frequency-augmented correlator 14 $CAF_{c,m}$. The induced error depends particularly on the shift relative to the central frequency and the duration during which the results of the multi-frequency correlation are integrated. Thus, the induced error at time n×T expressed in code moments may be determined as follows:

$$\text{induced error } (nT) = \frac{nT|\omega_m|}{f}$$

where n is the integration increment such that n is a natural integer and f is the signal scale factor.

This is simply a non-limitative example, other methods of determining the induced error could be chosen. The determination of the induced error depends particularly on the choice of shifts applied to the carriers used in the frequency-augmented correlators 14.

Once the induced error has been determined, it is compared with the code space α between the code correlators 12. Therefore, an attempt is made to determine the value of the induced error expressed as an integer number of code spaces between code correlators 12, which is equivalent to using the integer part of the division of the previously determined induced error by the code space between correlators α:

$$E\left(\frac{\text{erreur induite } (nT)}{\alpha}\right) = E\left(\frac{nT|\omega_m|}{f}\frac{1}{\alpha}\right)$$

If the induced error expressed as an integer number of code spaces between code correlators 12 increases between two consecutive integration increments (n−1)×T and n×T, the summated results are transferred from the first frequency-augmented correlator 14 $CAF_{c,m}$ to a second frequency-augmented correlator 14 $CAF_{c-1,m}$ or $CAF_{c+1,m}$, the second frequency-augmented correlator 14 $CAF_{c-1,m}$ or $CAF_{c+1,m}$ using the same frequency-shift as the first frequency-augmented correlator 14 $CAF_{c,m}$, and therefore sharing the same index m and being associated with a second code correlator 12 that is shifted by the code space from the first correlator 12 with which said first frequency-augmented correlator 14 is associated, in other words the second code correlator 12 will be the c−1$^{th}$ or the c+1$^{th}$.

Moreover, the summated results of the first frequency-augmented correlator 14 $CAF_{c,m}$ associated with the $c^{th}$ code correlator 12 are transferred to the second frequency-augmented correlator 14 $CAF_{c-1,m}$ or $CAF_{c+1,m}$ associated with the c−1$^{th}$ or c+1$^{th}$ code correlator 12 depending on the sign of the frequency-shift of the first frequency-augmented correlator 14 $CAF_{c,m}$ relative to the central frequency, which determines the second frequency-augmented correlator 14 $CAF_{c-1,m}$ or $CAF_{c+1,m}$ relative to the first frequency-augmented correlator 14 $CAF_{c,m}$.

The induced error depends on the absolute value of the frequency-shift $\omega_m$.

Consequently in order to accelerate the calculations, the induced error can be determined in parallel with the transfer of summated results, for frequency-augmented correlators 14 shifted by $\omega_m$ and $\omega_m$ respectively relative to the central frequency.

An example of instructions enabling use of the invention is given below in the form of pseudo-code, in other words without reference to a particular programming language. For this example, $I_{c,m}$ and $Q_{c,m}$ are the two components of the output from a frequency-augmented correlator 14 shifted by a frequency $\omega_m$ associated with the $c^{th}$ code correlator 12 of a channel, shifted by c−1 code spaces from the first code correlator 12 of the channel. The indexes of the other terms are created using the same principles. The sum of the results is denoted SE, N denotes the total number of code correlators 12 of the channel, n is the increment and K is the maximum number of iterations such that $T_i$=KT, where T is the sampling period of the outputs from the frequency-augmented correlators and $T_i$ is the total integration period.

```
WHILE n≤K DO
    Ec,m = I_{c,m}^2 + Q_{c,m}^2
    n=n+1
    IF (E(n x T x |ω_m|/(f x α)) = E((n−1) x T x |ω_m|/(f x a))) THEN
        SE_{c,m} = SE_{c,m} + E_{c,m}
    ELSE
        IF ω_m<0 THEN
            IF c>1 THEN
                SE_{c−1,m} = SE_{c,m} + E_{c,m}
            ELSE
                SE_{c,m} = E_{c,m}
            END IF
        END IF
        IF ω_m>0 THEN
            IF c<N THEN
                SE_{c,m} = SE_{c+1,m} + E_{c,m}
            ELSE
                SE_{c,m} = E_{c,m}
            END IF
        END IF
    END IF
END WHILE
```

Figure 3:
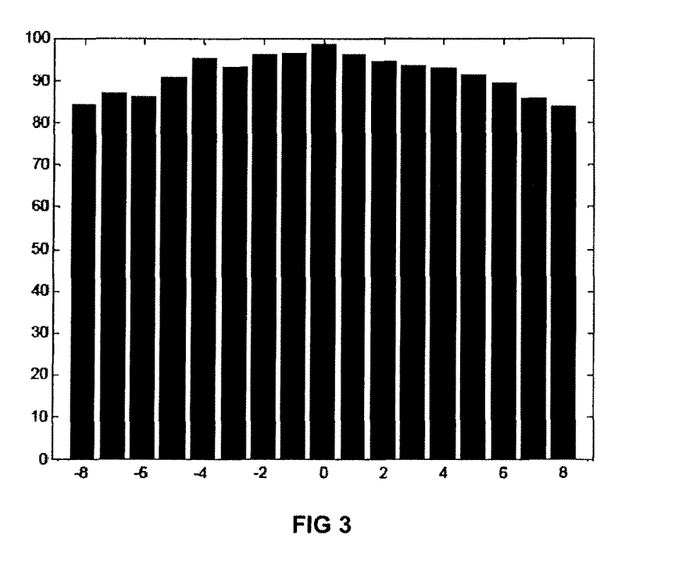
FIG. 3 is a graph showing detection probabilities of a signal as a function of the frequency-shift index of the carriers used in frequency-augmented correlators applying the method according to the invention, under the same conditions as those shown in FIG. 2.

FIG. 3 shows the results of the method applied to the situation in FIG. 2 in which an attempt is made to acquire the strongly jammed signal and requiring a long integration time $T_i$. It can be seen that the most extreme frequency-shifts are once again usable.

However, if the method is used on a single channel, in other words intra-channel compensation for the consequences of the induced error, $E(T_i \times |\omega_m|/(f \times \alpha))$ correlators are lost for a given frequency-shift $\omega_m$ due to successive transfers of energy accumulations to the frequency-augmented correlator 14 using the same frequency-shift and associated with a nearby code correlator 12. The consequence is that the search domain is scanned by only (N−max($E(T_i \times |\omega_m|/f/\alpha)$))×(2M+1) frequency-augmented correlators 14.

This effect can advantageously be corrected by using compensation between channels, in other words an inter-channel compensation for the consequences of the induced error. In searching for a given signal using a plurality of channels in parallel, with identical Doppler shift compensation commands and code generation speed, a meta-channel composed of a plurality of channels is used. This meta-channel implements a multi-code correlation with code correlators 12 of said plurality of channels and a multi-frequency correlation with the frequency-augmented correlators 14 associated with said code correlators 12.

One particular result is that the code correlators 12 of said plurality of channels forming the meta-channel make a multi-code correlation of the received signal with the replica signals $S_1$, $S_c$, $S_N$ successively code shifted relative to each other by a code space, such that their correlation domains are adjacent.

Therefore, the method is implemented on a meta-channel in a similar manner to its implementation on a channel. The relative loss of useful frequency-augmented correlators 14 is lower, and the multi-code and multi-frequency correlation architecture is then optimal to reduce weak or jammed signal acquisition times.

Another purpose of the invention is a receiver in a satellite positioning system with several channels each comprising several code correlators 12, said channels comprising at least a replica signal generator 8, a shift register 10, an acquisition module 3 to command compensation for the Doppler shift, said receiver also being configured to implement the method according to the invention described above.

The architecture of the multi-code and multi-frequency correlation makes it possible to increase the number of code-frequency assumptions tested simultaneously and therefore to reduce acquisition times of GPS, Galileo, Glonass or other types of GNSS signals. However, this gain is limited as soon as integration times increase to allow the acquisition of weak or jammed signals.

This limitation is eliminated through the compensation for the intra-channel and inter-channel induced error, and it becomes possible to acquire GNSS signals with very low signal to noise density ratios, while making use of the full capacity of a multi-code and multi-frequency correlator architecture.

The invention claimed is:

1. Method for acquisition of a signal emitted by a satellite, by a receiver in a satellite GNSS Global Positioning System, having several channels, each comprising several code correlators (12) with which frequency-augmented correlators (14) are associated, the method comprising steps in which:
code correlators (12) of a channel are used to create a multi-code correlation of the received signal (2) with replica signals successively code-shifted relative to each other by a code space,
frequency-augmented correlators (14) associated with a code correlator (12), are used to create a multi-frequency correlation of the result of the correlation of the code correlator (12) with carriers shifted in frequency relative to a central frequency coherent of the generation speed of the replica signal of the code correlator (12), an error being induced at the output from each frequency-augmented correlator (14) depending on the shift relative to the central frequency and the duration during which the results of the multi-frequency correlation are integrated,
wherein the method being also includes steps according to which:
the successive results of each frequency-augmented correlator (14) are summated at several instants during an integration period of the results of the multi-frequency correlation,
if the error induced at the output from a first frequency-augmented correlator (14) expressed as an integer number of code spaces between the code correlators (12) at each of these instants has increased relative to the induced error expressed as an integer number of code spaces between code correlators (12) at the output from the same correlator (14) valid in the previous instant, then the summated results of the first frequency-augmented correlator (14) are transferred to the summated results of a second frequency-augmented correlator (14), the second frequency-augmented correlator (14) using the same frequency-shift as the first frequency-augmented correlator (14) and being associated with a second code correlator (12) that is shifted by the code space from the first code correlator (12) with which said first frequency-augmented correlator (14) is associated.

2. Acquisition method according to claim 1, in which the summated results of the frequency-augmented correlator (14) associated with the first correlator (12) are transferred to the second frequency-augmented correlator (14) associated with the second code correlator (12), depending on the sign of the frequency-shift of the first frequency-augmented correlator (14) relative to the central frequency.

3. Acquisition method according to claim 1 wherein the method is applied on a meta-channel composed of a plurality of channels in parallel using a multi-code correlation with code correlators (12) of said plurality of channels and a multi-frequency correlation with the frequency-augmented correlators (14) associated with said code correlators (12).

4. Acquisition method according to claim 1 wherein the summation times of the successive results of each frequency-augmented correlator (14) are chosen at an inverse frequency of the sampling period T of the outputs from the frequency-augmented correlators (14).

5. Acquisition method according to claim 1 including, for each said instant, determination of the induced error, said determination and the transfer of summated results being used in parallel for frequency-augmented correlators (14) shifted by $\omega_m$ and $\omega_m$ respectively relative to the central frequency.

6. Acquisition method according to claim 1 wherein the frequency-shift of the carriers relative to the central frequency is $$\omega_m = \frac{m}{aT}$$

where m∈[−M; M], in which a and T are reals and M and m integers and in which:
the results of the correlation by code correlators (12) are sampled at a period T/M,
the output from a frequency-augmented correlator (14) corresponds to the sum of M samples of a convolution between the output from the code correlator (12) with which the frequency-augmented correlator (14) is associated and the frequency-shifted carrier relative to the central frequency.

7. Acquisition method according to claim 6, wherein the induced error is determined at a time n×T according to:

$$\text{induced error } (nT) = \frac{nT|\omega_m|}{f}$$

where n is the integration increment such that n is a natural integer and f is a scale factor of the signal defined by $$f = \frac{\text{transmission throughput of the satellite signal spread code (moments/s)}}{\textit{frequency of } \text{the satellite signal carrier wave (Hz)}}.$$

8. Acquisition method according to claim 1, comprising compensation for the Doppler shift used for the nominal frequency of the satellite signal carrier, said compensated nominal frequency corresponding to said central frequency.

9. Acquisition method according to claim 1, characterised in that the satellite positioning system is the GPS global positioning system, the carrier of said signal output from a satellite possibly being so-called carriers L1 or L2 with frequencies of 1575.42 MHz and 1227.6 MHz respectively, said signal being phase-modulated by a spread code that may be the C/A code or the P(Y) code.

10. Receiver in a satellite positioning system with several channels each comprising several correlators (12, 14), said channels comprising at least a code replica generator (8), a shift register (10) and an acquisition module (3) to control compensation for the Doppler shift, said receiver also being configured to implement the method according to any one of the previous claims.

* * * * *

UNITED STATES PATENT AND TRADEMARK OFFICE
CERTIFICATE OF CORRECTION

PATENT NO. : 8,665,927 B2
APPLICATION NO. : 13/370211
DATED : March 4, 2014
INVENTOR(S) : Denis Bouvet and Ghislain Luneau It is certified that error appears in the above-identified patent and that said Letters Patent is hereby corrected as shown below:

Delete Title Page, and replace with new Title Page. (Attached)

In the Drawings

Delete Drawing Sheet 1, and replace with Drawing Sheet 1. (Attached)

In the Specification

Column 4, line 39, please delete "-m and m" and insert -- $-\omega_m$ and $\omega_m$ --.

Column 7, line 66, please delete "$\omega_m$ and $\omega_m$" and insert -- $\omega_m$ and $-\omega_m$ --.

In the Claims

Column 10, Claim 5, line 27, please delete "$\omega_m$ and $\omega_m$" and insert -- $\omega_m$ and $-\omega_m$ --.

Signed and Sealed this
Twenty-second Day of July, 2014

Michelle K. Lee
*Deputy Director of the United States Patent and Trademark Office*

(12) United States Patent
Bouvet et al.

(10) Patent No.: US 8,665,927 B2
(45) Date of Patent: Mar. 4, 2014

(54) ACQUISITION METHOD WITH IMPROVED MULTI-FREQUENCY CORRELATION

(75) Inventors: Denis Bouvet, Paris (FR); Ghislain Luneau, Paris (FR)

(73) Assignee: SAGEM Defense Securite, Paris (FR)

( * ) Notice: Subject to any disclaimer, the term of this patent is extended or adjusted under 35 U.S.C. 154(b) by 189 days.

(21) Appl. No.: 13/370,211

(22) Filed: Feb. 9, 2012

(65) Prior Publication Data
US 2012/0207144 A1 Aug. 16, 2012

(30) Foreign Application Priority Data
Feb. 11, 2011 (FR) .................. 11 00424

(51) Int. Cl.
*H04B 1/00* (2006.01)
(52) U.S. Cl.
USPC ........... 375/150; 375/136; 375/137; 375/146; 375/147; 375/260; 375/262; 375/265; 375/267; 375/340; 375/342; 375/343; 375/346; 375/347
(58) Field of Classification Search
USPC ........ 375/130, 136, 137, 146, 147, 150, 260, 375/262, 265, 267, 342, 346, 347, 350; 342/357.63, 357.64, 357.65, 357.68, 342/357.69, 357.74
See application file for complete search history.

(56) References Cited
U.S. PATENT DOCUMENTS

| 6,735,243 | B1 | 5/2004 | Akopian | |
| 6,810,072 | B1 * | 10/2004 | Akopian | 375/143 |
| 8,005,172 | B2 * | 8/2011 | Jang | 375/343 |
| 8,193,980 | B2 * | 6/2012 | Nayyar | 342/357.48 |
| 8,428,107 | B1 * | 4/2013 | Best et al. | 375/147 |
| 2010/0040115 | A1 | 2/2010 | Cho et al. | |

OTHER PUBLICATIONS

David Akopian, A Fast Satellite Acquisition Method, ION GPS 2001, Sep. 11, 2001, pp. 2871-2881, Salt Lake City, UT, USA.

* cited by examiner

*Primary Examiner* — Dhaval Patel
(74) *Attorney, Agent, or Firm* — Blakely Sokoloff Taylor & Zafman (57) ABSTRACT

The invention relates to a method for acquisition of a signal (2) emitted by a satellite, by a receiver in a satellite Positioning System using a multi-code correlation and a multi-frequency correlation, also comprising the step in which if the error induced at the output from a first frequency-augmented correlator (14) at each instant in an integration period is greater than the code space between code correlators (12), the summated results of the first frequency-augmented correlator (14) are transferred to the summated results of a second frequency-augmented correlator (14), the second frequency-augmented correlator (14) using the same frequency-shift as the first frequency-augmented correlator (14) and being associated with a second code correlator (12) that is shifted by the code space from the first code correlator (12) with which said first frequency-augmented correlator (14) is associated.

10 Claims, 2 Drawing Sheets

FIG. 1